(12) United States Patent
Huang

(10) Patent No.: US 11,263,448 B2
(45) Date of Patent: Mar. 1, 2022

(54) DOCUMENT IDENTIFICATION METHOD AND SYSTEM

(71) Applicant: Alipay Labs (Singapore) Pte. Ltd., Singapore (SG)

(72) Inventor: Jiangbo Huang, Hangzhou (CN)

(73) Assignee: ALIPAY LABS (SINGAPORE) PTE. Ltd., Singapore (SG)

( * ) Notice: Subject to any disclaimer, the term of this patent is extended or adjusted under 35 U.S.C. 154(b) by 0 days.

(21) Appl. No.: 17/352,940

(22) Filed: Jun. 21, 2021

(65) Prior Publication Data

US 2022/0004754 A1  Jan. 6, 2022

(30) Foreign Application Priority Data

Jul. 1, 2020 (SG) .......................... 10202006357U

(51) Int. Cl.
*G06K 9/00* (2006.01)
*G06N 20/00* (2019.01)
(Continued)

(52) U.S. Cl.
CPC ...... *G06K 9/00456* (2013.01); *G06K 9/00711* (2013.01); *G06K 9/6256* (2013.01);
(Continued)

(58) Field of Classification Search
CPC .................................................. G06N 3/0454
See application file for complete search history.

(56) References Cited

U.S. PATENT DOCUMENTS

| 10,170,135 B1 * | 1/2019 | Pearce | ..................... H04R 3/00 |
| 10,635,898 B1 * | 4/2020 | Pribble | .................. G06K 9/228 |

(Continued)

FOREIGN PATENT DOCUMENTS

| CN | 106645409 | 5/2017 |
| CN | 108053838 | 5/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Hadi Akhavannik
(74) *Attorney, Agent, or Firm* — Fish & Richardson P.C.

(57) ABSTRACT

Disclosed are computer-implemented methods, non-transitory computer-readable media, and systems for document identification. One computer-implemented method includes extracting a sequence of image frames from a video clip capturing an impact of an object against a surface. A stream of audio signals is extracted from the video clip. Using a trained document identification model, a first score and a second score is generated based on the sequence of image frames and the stream of audio signals, respectively. The trained document identification model is trained with a plurality of historical video clips, where each video clip captures an impact of a document against a surface. An identification score is generated based on the first score and the second score. Whether the object in the video clip is a document is determined based on a comparison between the identification score and an identification threshold.

20 Claims, 5 Drawing Sheets

(51) Int. Cl.
G10L 25/57 (2013.01)
G10L 25/30 (2013.01)
G06K 9/62 (2022.01)

(52) U.S. Cl.
CPC .............. G06N 20/00 (2019.01); G10L 25/30 (2013.01); G10L 25/57 (2013.01)

(56) References Cited

U.S. PATENT DOCUMENTS

| | | | |
|---|---|---|---|
| 10,873,456 B1* | 12/2020 | Dods | H04L 9/14 |
| 2012/0030108 A1 | 2/2012 | Katina | |
| 2019/0034734 A1* | 1/2019 | Yen | G06T 7/246 |
| 2019/0042894 A1* | 2/2019 | Anderson | G06K 9/6257 |
| 2019/0102667 A1* | 4/2019 | Bashkirov | G06N 5/022 |
| 2020/0021873 A1* | 1/2020 | Swaminathan | G06Q 30/0276 |
| 2020/0293783 A1* | 9/2020 | Ramaswamy | G06N 3/00 |
| 2020/0356760 A1* | 11/2020 | Li | G06K 9/00671 |
| 2021/0141896 A1* | 5/2021 | Streit | G06K 9/6262 |

FOREIGN PATENT DOCUMENTS

| | | |
|---|---|---|
| CN | 110781916 | 2/2020 |
| CN | 111353434 | 6/2020 |
| WO | WO2018174824 | 9/2018 |

OTHER PUBLICATIONS

Nakamoto, "Bitcoin: A Peer-to-Peer Electronic Cash System," www.bitcoin.org, 2005, 9 pages.

Extended European Search Report in European Application No. 21180148.5, dated Nov. 9, 2021, 8 pages.

Owens et al., "Visually Indicated Sounds," 2016 IEEE Conference on Computer Vision and Pattern Recognition (CVPR), Jun. 27, 2016, pp. 2405-2413.

Sterling et al., "ISNN: Impact Sound Neural Network for Audio-Visual Object Classification," International Conference on Image Analysis and Processing, Oct. 7, 2018, pp. 578-595.

* cited by examiner

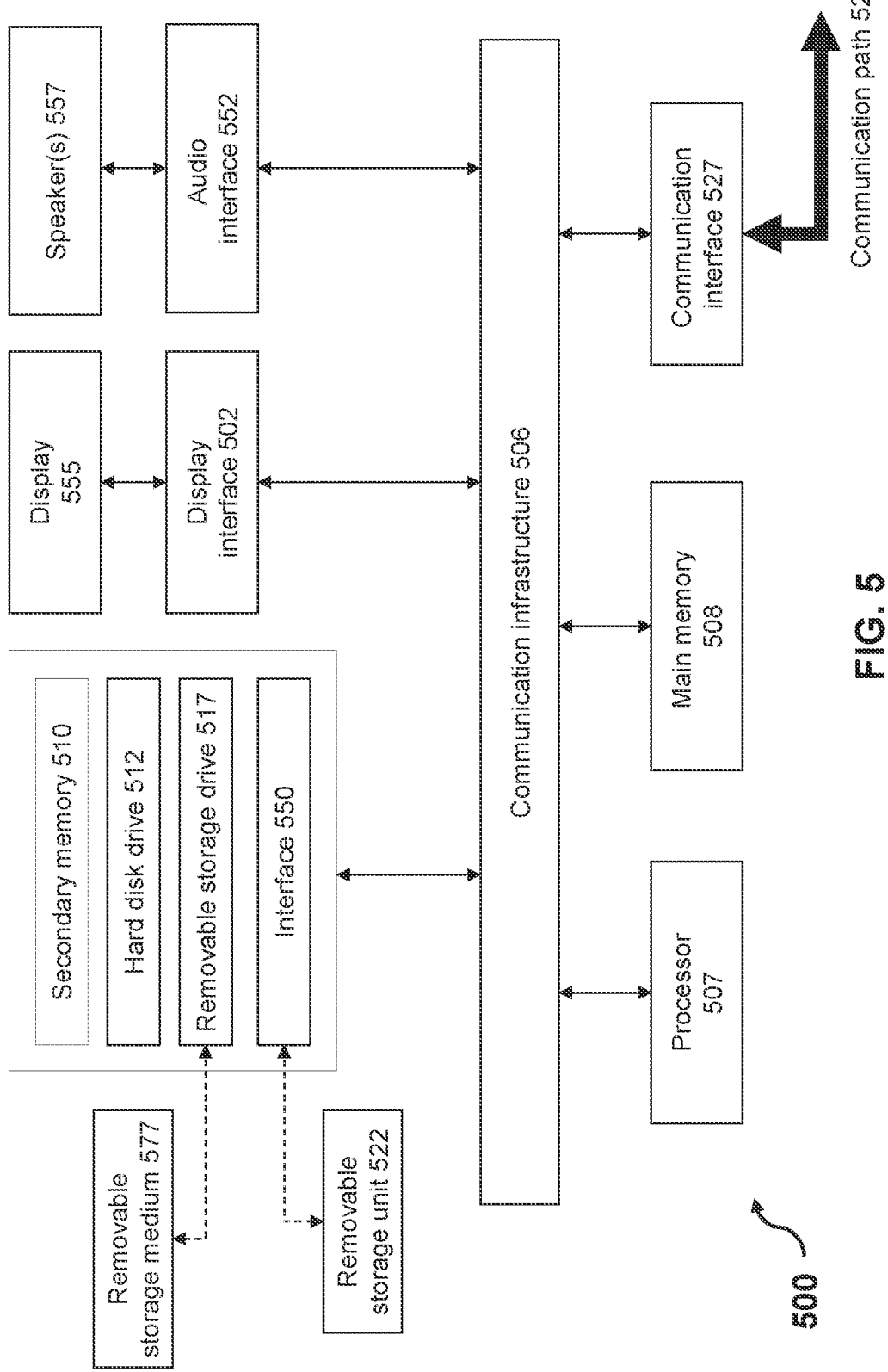

DOCUMENT IDENTIFICATION METHOD AND SYSTEM

CROSS-REFERENCE TO RELATED APPLICATIONS

This application claims priority to Singapore Patent Application No. 10202006357U, filed on Jul. 1, 2020, which is hereby incorporated by reference in its entirety.

TECHNICAL FIELD

The present disclosure generally relates to a document identification method and to a document identification system.

BACKGROUND ART

Identity theft occurs when someone uses another's identification (ID) information, e.g. name, identifying number, credit card number etc., without the other's permission, to commit fraud or other crimes. Business entities and service providers perform electronic-Know Your Customer (eKYC), a digital due diligence process, to mitigate identity theft and to verify the identity of its users. eKYC processes include a series of checks conducted at the initial stage of the relationship between the business entities or service providers with the users to authenticate the users' identities. One of the checks in the eKYC processes typically include users submitting scanned or photographed copies of their official ID documents, e.g. ID card, driving license, passport, etc. as part of the authentication process, to verify inherence factor (i.e. whether the user is who he/she says to be) and ownership factor (i.e. whether the user possesses the actual physical document). The submitted documents are typically further analysed to authenticate the users.

However, it can be difficult to verify ownership factor with scanned or photographed copies of official ID documents. Methods used by the business entities or service providers to validate ownership factor typically include detecting and identifying the documents with computer vision algorithms. However, these computer vision algorithms may not readily identify manipulated or falsified ID documents, and typically require large training data sets, resources and time to achieve low identification error rates. Moreover, malicious actors, seeking to defeat the computer vision algorithms, may use scanned/photographed copies of genuine ID documents in the eKYC processes to commit identity theft. The computer vision algorithms can identify that these submitted documents visually correspond to an actual physical document and allow the user authentication process to further progress on the basis that the ownership factor requirement is met. Hence, it can be difficult to prove that a user possesses the actual physical document with computer vision algorithms.

SUMMARY

In an embodiment, there is provided a document identification method. The method includes extracting, using an image frame extraction device, a sequence of image frames from a video clip, the video clip capturing impact of an object against a surface, extracting, using an audio signal extraction device, a stream of audio signals from the video clip, and generating, using a processing device, a first score based on the sequence of image frames and a second score based on the stream of audio signals, using a trained document identification model. The document identification model is trained with a plurality of historical video clips, each of the plurality of historical video clips capturing impact of a document against a surface. The method also includes generating, using the processing device, an identification score based on the first score and the second score, and identifying, using the processing device, if the object in the video clip is a document based on a comparison between the identification score and an identification threshold.

In another embodiment, there is provided a document identification system. The document identification system includes an image frame extraction device configured to extract a sequence of image frames from a video clip, the video clip capturing impact of an object against a surface, and an audio signal extraction device configured to extract a stream of audio signals from the video clip. The document identification system also includes a processing device configured to generate, using a trained document identification model, a first score based on the sequence of image frames and a second score based on the stream of audio signals, generate an identification score based on the first score and the second score, and identify, if the object in the video clip is a document, based on a comparison between the identification score and an identification threshold. The document identification model is trained with a plurality of historical video clips, each of the plurality of historical video clips capturing impact of a document against a surface.

Details of one or more embodiments of the subject matter of this specification are set forth in the accompanying drawings and the description below. Other desirable features and characteristics will become apparent from the subsequent description and the appended claims, taken in conjunction with the accompanying drawings and the background of the disclosure.

BRIEF DESCRIPTION OF DRAWINGS

Embodiments will be better understood and readily apparent to one of ordinary skill in the art from the following written description, by way of example only, and in conjunction with the drawings, in which:

FIG. 5 shows a schematic diagram of a computing device used to realise the system of FIG. 4.

Figure 1:
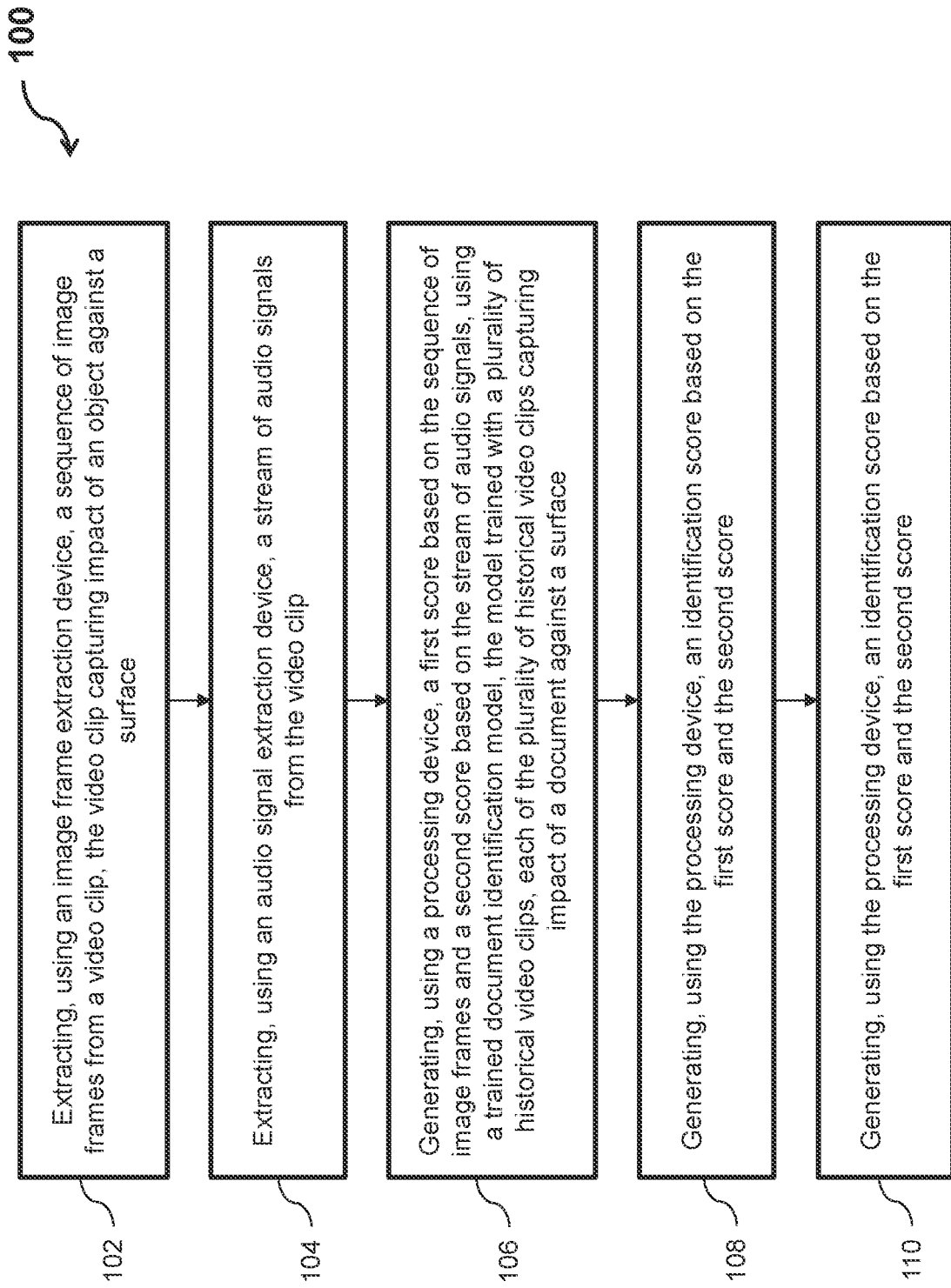
FIG. 1 shows a flowchart illustrating a method for identifying a document, in accordance with embodiments of the disclosure.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help to improve understanding of the present embodiments.

DESCRIPTION OF EMBODIMENTS

Embodiments of the present disclosure will be described, by way of example only, with reference to the drawings.

Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "associating", "calculating", "comparing", "determining", "extracting", "forwarding", "generating", "identifying", "including", "inserting", "modifying", "receiving", "recording", "replacing", "scanning", "transmitting", "updating" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes or may include a computer or other computing device selectively activated or reconfigured by a computer program stored therein. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the mobile telephone system. The computer program when loaded and executed on a computer effectively results in an apparatus that implements the steps of the preferred method.

In embodiments of the present disclosure, use of the term 'server' may mean a single computing device or at least a computer network of interconnected computing devices which operate together to perform a particular function. In other words, the server may be contained within a single hardware unit or be distributed among several or many different hardware units.

The term "configured to" is used in the specification in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

electronic-Know Your Customer (eKYC) is a digital due diligence process performed by a business entity or service provider to verify the identity of its users, to detect identity theft and to prevent identity fraud. Identity fraud is unauthorised use of someone's personal information by another, to commit a crime or to deceive or defraud that person or a third party. Authentication of the users can be considered as a form of detection in which legitimacy of users are verified and potential fraudsters identified before fraudulent acts can be carried out. Effective authentication can enhance security of systems of the business entity or service provider and mitigate identity fraud.

In a typical eKYC process, a user is required to take a photograph of his/her identification (ID) document, e.g. ID card, driving license, passport, etc. as part of the authentication process, to verify ownership factor (i.e. whether the user possesses the actual physical document) and inherence factor (i.e. whether the user is who he/she says to be). Current methods used to verify ownership factor in the eKYC process involve training a computer vision algorithm with images of actual and fraudulent ID documents, using the trained computer vision algorithm to classify if a presented image visually corresponds to an actual document, and associating the classification result with an indication of the ownership factor. For example, a classification result indicating that the presented image corresponds to an actual document would be associated with a verified ownership factor. However, malicious actors such as identity thefts may use scanned/photographed copies of genuine documents in the eKYC processes. Such documents can defeat the computer vision algorithms, as the computer vision algorithms may identify that these documents visually correspond to an actual physical document, that the user possesses the physical document and allow the eKYC process to further progress.

Embodiments seek to provide a document identification method and a document identification system that can identify if an object, whose impact against a surface is captured in a video clip, is a physical document using video and audio data from the video clip. Thus, the document identification method and system can provide an alternative approach to validating ownership factor in an eKYC process. In embodiments, the document identification method and system comprise a trained document identification model. Users in an eKYC process record impact of the document against the surface in a video clip. Image frame and audio signals can be extracted from the video clip, and the trained document identification model can identify, using the extracted image frame and audio signals, if the object in the video clip is the document required in the eKYC process.

The techniques described in the specification produce one or more technical effects. Particularly, implementation of a document identification method that identifies using both extracted image frames and audio signals from the video clip capturing impact of the object against the surface, if the object in the video clip is an actual physical document, can result in a more reliable and robust verification of ownership factor (i.e. the user possesses the actual physical document) in the eKYC process, compared to using traditional computer vision algorithms.

Figure 4:
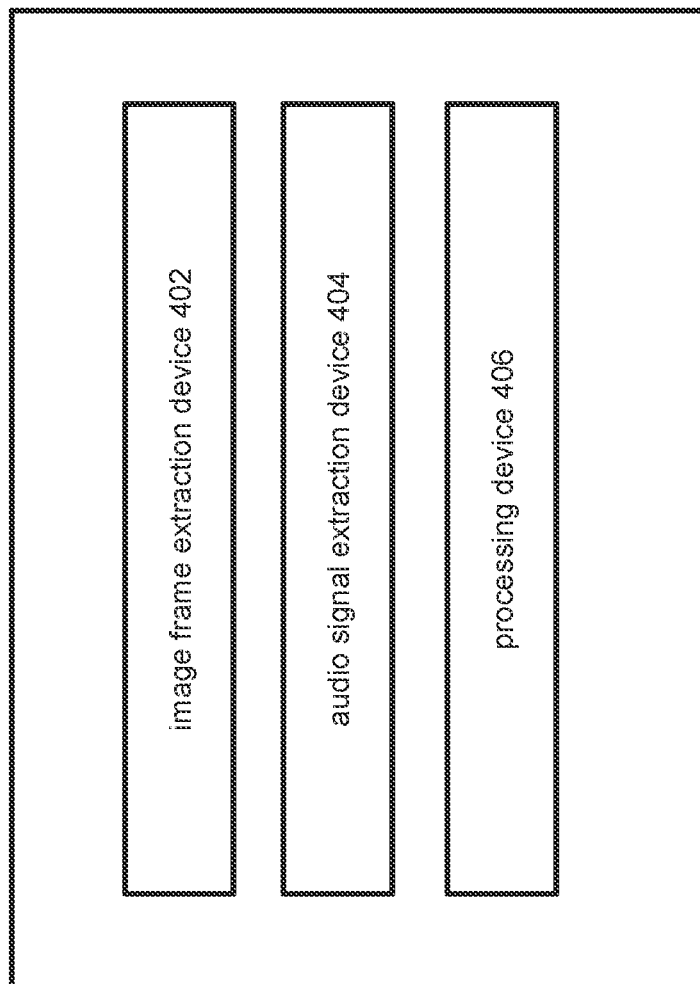
FIG. 4 shows a schematic diagram illustrating an example of a document identification system, in accordance with embodiments of the disclosure.

FIG. 1 shows a flowchart illustrating a method 100 for identifying a document, in accordance with embodiments of the disclosure. The method 100 can be implemented by a document identification system 400 shown in FIG. 4, which includes an image frame extraction device 402, an audio signal extraction device 404 and a processing device 406. The method 100 broadly includes step 102 of extracting, using the image frame extraction device 402, a sequence of image frames from a video clip capturing impact of an object against a surface, and step 104 of extracting, using the audio signal extraction device 404, a stream of audio signals from the video clip. The method 100 also includes step 106 of generating, using the processing device 406, a first score based on the sequence of image frames and a second score based on the stream of audio signals, using a trained document identification model. The trained document identification model is trained with a plurality of historical video clips, each of the plurality of historical video clips capturing impact of a document against a surface. The method 100 further includes step 108 of generating, using the processing device 406, an identification score based on the first score and the second score and step 110 of identifying, using the processing device 406, if the object in the video clip is a document based on a comparison between the identification score and an identification threshold.

In embodiments, the method 100 can include receiving the video clip capturing impact of the object against a surface. The video clip can be recorded by a user using a mobile device for an eKYC process, which require the user to throw an identification (ID) document (e.g. ID card, driving license, passport, etc.) against the surface. In an implementation, the surface can be a table top. In step 102, the sequence of image frames can be extracted from the video clip using the image frame extraction device 402, with a library of programming functions for image and video processing. An example library is OpenCV. In step 104, the stream of audio signals from the video clip can be extracted from the video clip using the audio signal extraction device 404, with a library of programming functions for audio processing. An example library is MoviePy.

The first score is generated in step 106 using the processing device 406, based on the sequence of image frames, with the trained document identification model. In an implementation, the trained document identification model can include a trained convolutional neural subnetwork. In an implementation, the size of an image frame can be H×W, and the number of consecutive image frames can be $C_0$. The sequence of image frames can be concatenated into a multi-dimensional tensor (e.g. a feature map of size H×W×$C_0$) and used as an input for the trained convolutional neural subnetwork to generate the first score. In other words, the convolutional neural subnetwork can classify the object, and output a classification result based on the sequence of image frames. The trained convolutional neural subnetwork can include a fully connected neural layer as the last layer of the neural network, and the first score can be generated with the fully connected neural layer as the classification result. The first score can be a score ranging from 0 to 1, and can represent a probability of whether the object, captured in the sequence of image frames, is a document (e.g. ID card, driving license, passport, etc. required for the eKYC process). In other words, the first score is generated by the trained document identification model based on image data in the video, and is indicative of whether an object impacted against a surface in the video is a document. The process of training the convolutional neural subnetwork, and the training dataset for the convolutional neural subnetwork will be described in more detail in the latter part of the disclosure, with reference to FIG. 2, which shows a flowchart illustrating a method 200 for training a document identification model.

The second score is generated in step 106 using the processing device 406, based on the stream of audio signals, with the trained document identification model. In an implementation, the trained document identification model can include a trained recurrent neural subnetwork. The stream of audio signals can be preprocessed and concatenated into another multi-dimensional tensor (e.g. a feature map of size H×W×$C_1$) with an audio processing library and the multi-dimensional tensor can be used as an input for the trained recurrent neural subnetwork to generate the second score. In other words, the recurrent neural subnetwork can classify the object, and output a classification result based on the stream of audio signals. The trained recurrent neural subnetwork can include a fully connected neural layer as the last layer of the neural network, and the second score can be generated with the fully connected neural layer as the classification result. The second score can be a score ranging from 0 to 1, and can represent a probability of whether the object is a document (e.g. ID card, driving license, passport, etc. required for the eKYC process) based on audio signals associated with the impact of the object against the surface in the video. In an implementation, the second score can be indicative of the type of material of the object impacted against a surface in the video. The training dataset for the recurrent neural subnetwork can include a stream of historical audio signals from each of the plurality of historical video clips. The process of training the recurrent neural subnetwork, and the training dataset for the recurrent neural subnetwork is described in more detail in the latter part of the disclosure, with reference to FIG. 2, which shows a flowchart illustrating a method 200 for training a document identification model.

The identification score is generated by the processing device 406 in step 108 based on the first score and the second score, using the trained document identification model. The identification score represents a combined probability of whether the object in the video is a document. In an implementation, the identification score can be a weighted sum of the first score and the second score.

In an alternate implementation, the trained convolutional neural subnetwork and the trained recurrent neural subnetwork may not output a first and a second score as classification results. Rather, the trained convolutional neural subnetwork can be configured to output a representation of the sequence of image frames (e.g. an output feature map of the sequence of image frames), and the trained recurrent neural subnetwork can be configured to output a representation of the stream of audio signals (e.g. an output feature map of the stream of audio signals). These two output feature maps can be concatenated and used as input for one or more neural network layers to generate an identification score which represents a combined probability of whether the object in the video is a document In step 110, the object in the video clip is identified if the object is a document using the processing device 406 based on a comparison between the identification score and an identification threshold. The identification threshold can be varied based on application requirements (e.g. the identification threshold can be set higher for applications that require a relatively higher accuracy). The threshold may be determined based on a validation dataset (e.g. the plurality of historical video clips capturing impact of a document against a surface). The plurality of historical video clips may include (i) a positive class of historical videos clip of physical ID documents impacting a surface and (ii) a negative class of historical video clips of objects other than physical ID documents impacting a surface. The negative class of historical video clips can also include video clips that have no image data, video clips that have no audio data, and video clips with audio data indicative of an object impacting a surface without the object in the video. A receiver operating characteristic (ROC) curve can be established from the validation data. In an implementation, from the ROC curve, the threshold is set when the FAR (false accepted rate) is equal to 0.01 or 0.001.

Figure 2:
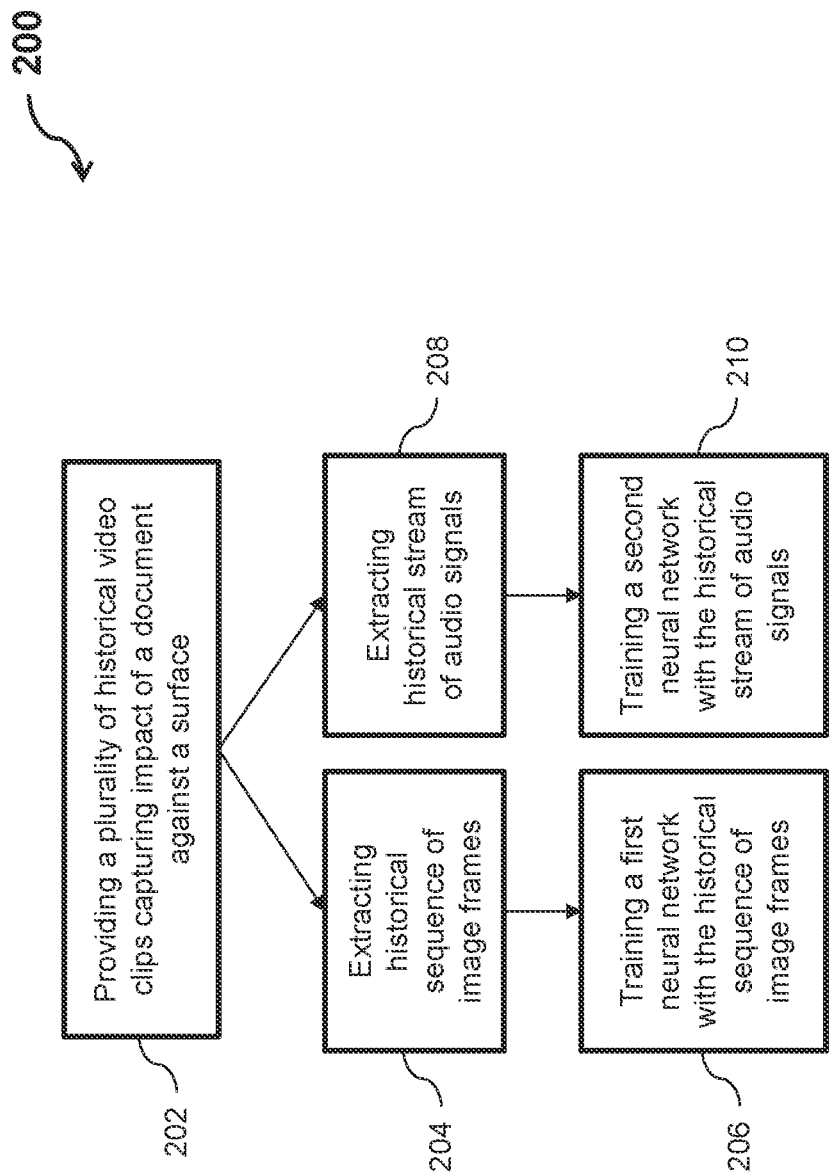
FIG. 2 shows a flowchart illustrating a method for training a document identification model, in accordance with embodiments of the disclosure.

FIG. 2 shows a flowchart illustrating a method 200 for training a document identification model, in accordance with embodiments of the disclosure. The method 200 includes step 202 of providing a plurality of historical video clips capturing impact of a document against a surface. In an implementation, the plurality of historical video clips can be considered training data for the document identification model. The plurality of historical video clips may include (i) a positive class of historical videos clip of physical ID documents impacting a surface and (ii) a negative class of historical video clips of objects other than physical ID documents impacting a surface. The physical ID documents in (i) can include ID documents from various jurisdictions such as, but not limited to: ID cards, driving licenses, birth certificates and passports. The objects other than physical ID documents in (ii) can include, but are not limited to: photocopies of ID documents, cardboards, name cards, payment cards, and booklets etc. The negative class of historical video clips can also include video clips that have no image data, video clips that have no audio data, and video clips with audio data indicative of an object impacting a surface without the object in the video. The range of historical video clips, the variety of objects and ID documents used in (i) and (ii) can increase robustness of the document identification model.

The method 200 includes step 204 of extracting a sequence of historical image frames from each of the plurality of historical video clips, using the image frame extraction device 402. Similar to step 102, the sequences of historical image frames can be extracted from the plurality of historical video clips with a library of programming functions for image and video processing, such as OpenCV. The extracted sequences of historical image frames are then used to train a first neural network in step 206. In an implementation, the first neural network can be a convolution neural network, and the step 206 of training the first neural network with the sequences of historical image frames can include concatenating each sequence of historical image frames into a multi-dimensional tensor and using the concatenated multi-dimensional tensors as inputs to train the convolutional neural network.

The method 200 also includes step 208 of extracting a stream of historical audio signals from each of the plurality of historical video clips using the audio signal extraction device 404. Similar to step 104, the stream of historical audio signals can be extracted from the plurality of historical video clips with a library of programming functions for audio processing, such as MoviePy. The extracted streams of historical audio signals are then used to train a second neural network in step 208. In an implementation, the second neural network can be a recurrent neural network, and the step 210 of training the second neural network with the streams of historical audio signals can include concatenating each stream of historical audio signals into a multi-dimensional tensor and using the concatenated multi-dimensional tensors as inputs to train the recurrent neural network.

Figure 3:
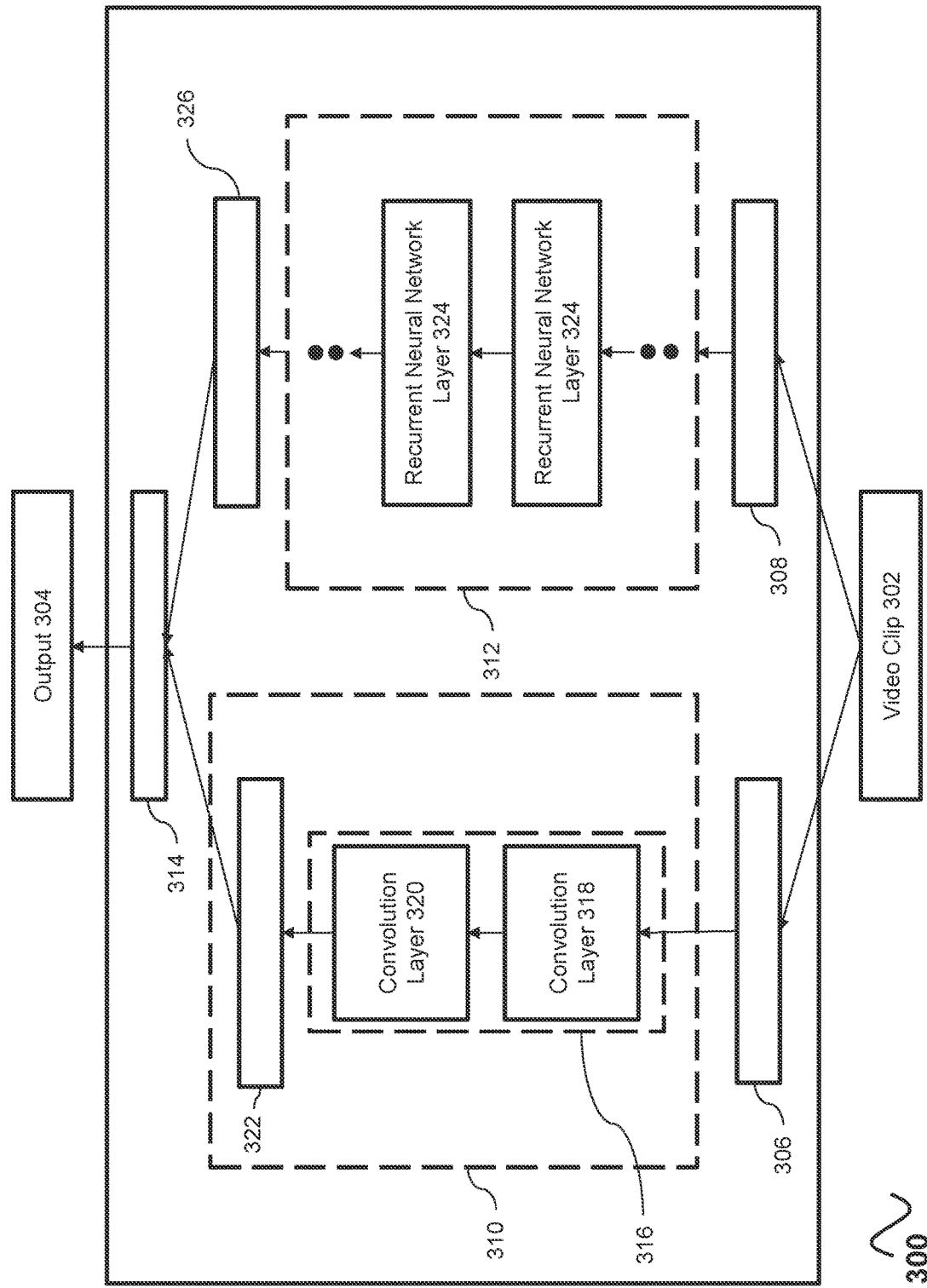
FIG. 3 shows a schematic diagram illustrating an example of a document identification model, in accordance with embodiments of the disclosure.

FIG. 3 shows a schematic diagram illustrating an example of a document identification model 300, in accordance with embodiments of the disclosure. The document identification model 300 can identify if an object, whose impact against a surface is captured in a video clip 302, is a physical document using video and audio data from the video clip 302, and generate an output 304 indicative of the identification. The document identification model 300 can include an image frame encoder subnetwork 306, an audio signal encoder subnetwork 308, a trained convolutional neural subnetwork 310, a trained recurrent neural subnetwork 312, and an output subnetwork 314.

In embodiments, the image frame encoder subnetwork 306 can generate a feature representation of the sequence of image frames with the video clip 302. The feature representation is used as an input for the trained convolutional neural subnetwork 310 to generate a first score. In FIG. 3, the convolution neural subnetwork 310 is depicted as a group 316 of two or more convolutional neural network layers 318, 320. While two convolutional neural network layers 318, 320 are shown, it can be appreciated that the trained convolutional neural subnetwork 310 can generally include multiple convolutional neural network layers and pooling layers (not shown). Each convolutional neural network layers can receive an input from the previous convolutional neural network layer, or, if the convolutional neural network layer is the first layer, from the image frame encoder subnetwork 306, and generate a layer output. That is, the feature representation of the sequence of image frames can be processed by each convolutional neural network layers 318, 320 to generate an output. The convolutional neural subnetwork 310 can also include a neural network layer 322 configured to output a final representation (e.g. vectors) based on representations generated by the convolutional neural network layer 320. In an implementation, the output representation can be a first score indicative of whether the object, captured in the sequence of image frames, is a document.

In embodiments, the audio signal encoder subnetwork 308 can generate a feature representation of the stream of audio signals for input to the trained recurrent neural subnetwork 312. For example, the representation can include a plurality of acoustic sequence, each including audio data corresponding to a specific time step in the stream of audio signals. The recurrent neural subnetwork 312 can include one or more recurrent neural network layers 324. In FIG. 3, while two recurrent neural network layers 324 are shown, it is appreciated that the trained recurrent neural subnetwork 312 can generally include multiple recurrent neural network layers arranged in a sequence from a first recurrent layer to a last recurrent layer. Each recurrent neural network layer 324 can receive an input from the previous recurrent neural network layer, or, if the recurrent neural network layer is the first layer, from the audio signal encoder subnetwork 308, and can generate a layer output for each specific time step. The recurrent neural subnetwork 312 can also include an output layer 326 configured to receive each recurrent output generated by the recurrent neural subnetwork 312 and generate another output representation. In an implementation, the output representation can be the second score indicative of whether an object impacted against a surface in the video is a document.

The output subnetwork 314 in the document identification model 300 can receive the respective output representations generated by the neural network layer 322 and the output layer 326, and generate an identification score based on the respective output representations, the identification score associated with a probability of whether the object, captured in the video, is a document. The output subnetwork 314 can further compare the identification score against an identification threshold, and generate an output 304 based on the comparison, the output 304 indicative of the identification.

FIG. 5 depicts a computing device 500, hereinafter interchangeably referred to as a computer system 500, where one or more such computing devices 500 may be used to execute the methods 100 and 200 of FIGS. 1 and 2. One or more components of the computing device 500 can also be used to implement the system 400 as well as the image frame extraction device 402, the audio signal extraction device 404, and the processing device 406. The following description of the computing device 500 is provided by way of example only and is not intended to be limiting.

As shown in FIG. 5, the example computing device 500 includes a processor 507 for executing software routines. Although a single processor is shown for the sake of clarity, the computing device 500 may also include a multi-processor system. The processor 507 is connected to a communication infrastructure 506 for communication with other components of the computing device 500. The communication infrastructure 506 may include, for example, a communications bus, cross-bar, or network.

The computing device 500 further includes a main memory 508, such as a random access memory (RAM), and a secondary memory 510. The secondary memory 510 may include, for example, a storage drive 512, which may be a hard disk drive, a solid state drive or a hybrid drive and/or a removable storage drive 517, which may include a magnetic tape drive, an optical disk drive, a solid state storage drive (such as a USB flash drive, a flash memory device, a solid state drive or a memory card), or the like. The removable storage drive 517 reads from and/or writes to a removable storage medium 577 in a well-known manner. The removable storage medium 577 may include magnetic tape, optical disk, non-volatile memory storage medium, or the like, which is read by and written to by removable storage drive 517. As will be appreciated by persons skilled in the relevant art(s), the removable storage medium 577 includes a computer readable storage medium having stored therein computer executable program code instructions and/or data.

In an alternative implementation, the secondary memory 510 may additionally or alternatively include other similar means for allowing computer programs or other instructions to be loaded into the computing device 500. Such means can include, for example, a removable storage unit 522 and an interface 550. Examples of a removable storage unit 522 and interface 550 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 522 and interfaces 550 which allow software and data to be transferred from the removable storage unit 522 to the computer system 500.

The computing device 500 also includes at least one communication interface 527. The communication interface 527 allows software and data to be transferred between computing device 500 and external devices via a communication path 526. In embodiments of the disclosure, the communication interface 527 permits data to be transferred between the computing device 500 and a data communication network, such as a public data or private data communication network. The communication interface 527 may be used to exchange data between different computing devices 500 which such computing devices 500 form part an interconnected computer network. Examples of a communication interface 527 can include a modem, a network interface (such as an Ethernet card), a communication port (such as a serial, parallel, printer, GPIB, IEEE 1394, RJ45, USB), an antenna with associated circuitry and the like. The communication interface 527 may be wired or may be wireless. Software and data transferred via the communication interface 527 are in the form of signals which can be electronic, electromagnetic, optical or other signals capable of being received by communication interface 527. These signals are provided to the communication interface via the communication path 526.

As shown in FIG. 5, the computing device 500 further includes a display interface 502 which performs operations for rendering images to an associated display 555 and an audio interface 552 for performing operations for playing audio content via associated speaker(s) 557.

As used herein, the term "computer program product" may refer, in part, to removable storage medium 577, removable storage unit 522, a hard disk installed in storage drive 512, or a carrier wave carrying software over communication path 526 (wireless link or cable) to communication interface 527. Computer readable storage media refers to any non-transitory, non-volatile tangible storage medium that provides recorded instructions and/or data to the computing device 500 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 500. Examples of transitory or non-tangible computer readable transmission media that may also participate in the provision of software, application programs, instructions and/or data to the computing device 500 include radio or infra-red transmission channels as well as a network connection to another computer or networked device, and the Internet or Intranets including e-mail transmissions and information recorded on Websites and the like.

The computer programs (also called computer program code) are stored in main memory 508 and/or secondary memory 510. Computer programs can also be received via the communication interface 527. Such computer programs, when executed, enable the computing device 500 to perform one or more features of embodiments discussed herein. In embodiments, the computer programs, when executed, enable the processor 507 to perform features of the above-described embodiments. Accordingly, such computer programs represent controllers of the computer system 500.

Software may be stored in a computer program product and loaded into the computing device 500 using the removable storage drive 517, the storage drive 512, or the interface 550. The computer program product may be a non-transitory computer readable medium. Alternatively, the computer program product may be downloaded to the computer system 500 over the communication path 526. The software, when executed by the processor 507, causes the computing device 500 to perform the necessary operations to execute the methods 100, 200 as shown in FIGS. 1 and 2.

It is to be understood that the embodiment of FIG. 5 is presented merely by way of example to explain the operation and structure of the system 500. Therefore, in some embodiments one or more features of the computing device 500 may be omitted. Also, in some embodiments, one or more features of the computing device 500 may be combined together. Additionally, in some embodiments, one or more features of the computing device 500 may be split into one or more component parts.

It will be appreciated that the elements illustrated in FIG. 5 function to provide means for performing the various functions and operations of the system as described in the above embodiments.

When the computing device 500 is configured to realise the system 400, the system 100 will have a non-transitory computer readable medium having stored thereon an application which when executed causes the system 400 to perform steps comprising: extracting, using an image frame extraction device, a sequence of image frames from a video clip, the video clip capturing impact of an object against a surface, extracting, using an audio signal extraction device, a stream of audio signals from the video clip; generating, using a processing device, a first score based on the sequence of image frames and a second score based on the stream of audio signals, using a trained document identification model, the model trained with a plurality of historical video clips, each of the plurality of historical video clips capturing impact of a document against a surface; generating, using the processing device, an identification score based on the first score and the second score; and identifying, using the processing device, if the object in the video clip is a document based on a comparison between the identification score and an identification threshold.

In embodiments, the computing device can include at least one processor 507 and a non-transitory computer-readable storage medium 512 coupled to the at least one processor 507 and storing programming instructions for execution by the at least one processor 507. The programming instructions can instruct the at least one processor 507 to, extract a sequence of image frames from a video clip, the video clip capturing impact of an object against a surface, extract a stream of audio signals from the video clip and generate a first score based on the sequence of image frames and a second score based on the stream of audio signals, using a trained document identification model. The document identification model is trained with a plurality of historical video clips, each of the plurality of historical video clips capturing impact of a document against a surface. The programming instructions can instruct the at least one processor 507 to generate an identification score based on the first score and the second score, and identify if the object in the video clip is a document based on a comparison between the identification score and an identification threshold.

In embodiments, the programming instructions can instruct the at least one processor 507 to identify the object in the video clip as a document on a condition that the identification score is larger than the identification threshold. In embodiments, the programming instructions can instruct the at least one processor 507 to determine the identification score based on a weighted sum of the first score and the second score.

In embodiments, the programming instructions can instruct the at least one processor 507 to extract a sequence of historical image frames from each of the plurality of historical video clips, extract a stream of historical audio signals from each of the plurality of historical video clips and train the document identification model with the sequence of historical image frames and the stream of historical audio signals.

In embodiments, the document identification model comprises a convolutional neural subnetwork and the programming instructions can instruct the at least one processor 507 to train the convolutional neural subnetwork with the sequence of historical image frames from each of the plurality of historical video clips.

In embodiments, the document identification model comprises a recurrent neural subnetwork and the programming instructions can instruct the at least one processor 507 to train the recurrent neural subnetwork with the stream of historical audio signals from each of the plurality of historical video clips.

In embodiments, the trained document identification model comprises a trained convolutional neural subnetwork, and the programming instructions can instruct the at least one processor 507 to generate the first score based on the sequence of image frames using the trained convolutional neural subnetwork. In embodiments, the trained document identification model comprises a trained recurrent neural subnetwork and the programming instructions can instruct the at least one processor 507 to generate the second score based on the stream of audio signals using the trained recurrent neural subnetwork.

In embodiments, the programming instructions can instruct the at least one processor 507 to process the first score and the second score through one or more groups of neural network layers to generate the identification score.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

What is claimed is:

1. A computer-implemented method for document identification, comprising:

extracting, using an image frame extraction device, a sequence of image frames from a video clip, wherein the video clip captures an impact of an object against a surface;

extracting, using an audio signal extraction device, a stream of audio signals from the video clip;

generating, using a processing device and a trained document identification model, a first score based on the sequence of image frames and a second score based on the stream of audio signals, wherein the trained document identification model is trained with a plurality of historical video clips, and wherein each of the plurality of historical video clips captures an impact of a document against a surface;

generating, using the processing device, an identification score based on the first score and the second score; and identifying, using the processing device and based on a comparison between the identification score and an identification threshold, if the object in the video clip is a document.

2. The computer-implemented method of claim 1, wherein generating the identification score comprises:

determining, using the processing device, a weighted sum of the first score and the second score; or processing the first score and the second score through one or more groups of neural network layers to generate the identification score.

3. The computer-implemented method of claim 1, further comprising:

extracting, using the image frame extraction device, a sequence of historical image frames from each of the plurality of historical video clips;

extracting, using the audio signal extraction device, a stream of historical audio signals from each of the plurality of historical video clips; and training, using the processing device and as the trained document identification model, a document identification model with the sequence of historical image frames and the stream of historical audio signals.

4. The computer-implemented method of claim 3, wherein the document identification model comprises a convolutional neural subnetwork, and wherein training the document identification model comprises training the convolutional neural subnetwork with the sequence of historical image frames from each of the plurality of historical video clips.

5. The computer-implemented method of claim 3, wherein the document identification model comprises a recurrent neural subnetwork, and wherein training the document identification model comprises training the recurrent neural subnetwork with the stream of historical audio signals from each of the plurality of historical video clips.

6. The computer-implemented method of claim 1, wherein the trained document identification model comprises a trained convolutional neural subnetwork, and wherein generating the first score comprises using the trained convolutional neural subnetwork to generate the first score based on the sequence of image frames.

7. The computer-implemented method of claim 1, wherein the trained document identification model comprises a trained recurrent neural subnetwork, and wherein generating the second score comprises using the trained recurrent neural subnetwork to generate the second score based on the stream of audio signals.

8. A non-transitory computer-readable medium storing one or more instructions executable by a computer system to perform operations for document identification, comprising:

extracting, using an image frame extraction device, a sequence of image frames from a video clip, wherein the video clip captures an impact of an object against a surface;

extracting, using an audio signal extraction device, a stream of audio signals from the video clip;

generating, using a processing device and a trained document identification model, a first score based on the sequence of image frames and a second score based on the stream of audio signals, wherein the trained document identification model is trained with a plurality of historical video clips, and wherein each of the plurality of historical video clips captures an impact of a document against a surface;

generating, using the processing device, an identification score based on the first score and the second score; and identifying, using the processing device and based on a comparison between the identification score and an identification threshold, if the object in the video clip is a document.

9. The non-transitory computer-readable medium of claim 8, wherein generating the identification score comprises:

determining, using the processing device, a weighted sum of the first score and the second score; or processing the first score and the second score through one or more groups of neural network layers to generate the identification score.

10. The non-transitory computer-readable medium of claim 8, further comprising:

extracting, using the image frame extraction device, a sequence of historical image frames from each of the plurality of historical video clips;

extracting, using the audio signal extraction device, a stream of historical audio signals from each of the plurality of historical video clips; and training, using the processing device and as the trained document identification model, a document identification model with the sequence of historical image frames and the stream of historical audio signals.

11. The non-transitory computer-readable medium of claim 10, wherein the document identification model comprises a convolutional neural subnetwork, and wherein training the document identification model comprises training the convolutional neural subnetwork with the sequence of historical image frames from each of the plurality of historical video clips.

12. The non-transitory computer-readable medium of claim 10, wherein the document identification model comprises a recurrent neural subnetwork, and wherein training the document identification model comprises training the recurrent neural subnetwork with the stream of historical audio signals from each of the plurality of historical video clips.

13. The non-transitory computer-readable medium of claim 8, wherein the trained document identification model comprises a trained convolutional neural subnetwork, and wherein generating the first score comprises using the trained convolutional neural subnetwork to generate the first score based on the sequence of image frames.

14. The non-transitory computer-readable medium of claim 8, wherein the trained document identification model comprises a trained recurrent neural subnetwork, and wherein generating the second score comprises using the trained recurrent neural subnetwork to generate the second score based on the stream of audio signals.

15. A computer-implemented system for document identification, comprising:

one or more computers; and one or more computer memory devices interoperably coupled with the one or more computers and having tangible, non-transitory, machine-readable media storing one or more instructions that, when executed by the one or more computers, cause the one or more computers to perform one or more operations comprising:

extracting, using an image frame extraction device, a sequence of image frames from a video clip, wherein the video clip captures an impact of an object against a surface;

extracting, using an audio signal extraction device, a stream of audio signals from the video clip;

generating, using a processing device and a trained document identification model, a first score based on the sequence of image frames and a second score based on the stream of audio signals, wherein the trained document identification model is trained with a plurality of historical video clips, and wherein each of the plurality of historical video clips captures an impact of a document against a surface;

generating, using the processing device, an identification score based on the first score and the second score; and identifying, using the processing device and based on a comparison between the identification score and an identification threshold, if the object in the video clip is a document.

16. The computer-implemented system of claim 15, wherein generating the identification score comprises:

determining, using the processing device, a weighted sum of the first score and the second score; or processing the first score and the second score through one or more groups of neural network layers to generate the identification score.

17. The computer-implemented system of claim 15, further comprising:

extracting, using the image frame extraction device, a sequence of historical image frames from each of the plurality of historical video clips;

extracting, using the audio signal extraction device, a stream of historical audio signals from each of the plurality of historical video clips; and training, using the processing device and as the trained document identification model, a document identification model with the sequence of historical image frames and the stream of historical audio signals.

18. The computer-implemented system of claim 17, wherein:

the document identification model comprises a convolutional neural subnetwork, and wherein training the document identification model comprises training the convolutional neural subnetwork with the sequence of historical image frames from each of the plurality of historical video clips; or the document identification model comprises a recurrent neural subnetwork, and wherein training the document identification model comprises training the recurrent neural subnetwork with the stream of historical audio signals from each of the plurality of historical video clips.

19. The computer-implemented system of claim 15, wherein the trained document identification model comprises a trained convolutional neural subnetwork, and wherein generating the first score comprises using the trained convolutional neural subnetwork to generate the first score based on the sequence of image frames.

20. The computer-implemented system of claim 15, wherein the trained document identification model comprises a trained recurrent neural subnetwork, and wherein generating the second score comprises using the trained recurrent neural subnetwork to generate the second score based on the stream of audio signals.

* * * * *